(12) United States Patent
Song et al.

(10) Patent No.: US 7,948,904 B1
(45) Date of Patent: May 24, 2011

(54) ERROR DETECTION FOR DATA FRAMES

(75) Inventors: David Dai Song, Union City, CA (US);
Kenneth S. Huang, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 530 days.

(21) Appl. No.: 11/457,347

(22) Filed: Jul. 13, 2006

(51) Int. Cl.
H04L 12/28 (2006.01)
H04L 12/56 (2006.01)
H04J 3/02 (2006.01)
(52) U.S. Cl. .......................... 370/244; 370/389; 370/535
(58) Field of Classification Search .................... None
See application file for complete search history.

(56) References Cited

U.S. PATENT DOCUMENTS

| | | | | |
|---|---|---|---|---|
| 5,265,096 | A * | 11/1993 | Parruck | 370/216 |
| 5,557,437 | A * | 9/1996 | Sakai et al. | 398/9 |
| 5,857,092 | A * | 1/1999 | Nakamura et al. | 710/62 |
| 6,829,741 | B1 | 12/2004 | Khansari et al. | |
| 6,862,380 | B2 * | 3/2005 | Chaudhuri et al. | 385/17 |
| 7,103,044 | B1 * | 9/2006 | Keller et al. | 370/392 |
| 7,218,442 | B2 * | 5/2007 | Akbaba et al. | 359/334 |
| 2003/0161355 | A1 * | 8/2003 | Falcomato et al. | 370/539 |
| 2006/0221865 | A1 * | 10/2006 | Hawbaker et al. | 370/255 |

OTHER PUBLICATIONS

SONET Telecommunications Standard Primer, Tektronix, "What is SONET", http://www.tektronix.com/optical, printed: Jul. 7, 2006, pp. 20 (total).

Prakash, K., Understanding SONET/SDH-electroSofts.com, ElectroSofts.com, "Understanding SONET/SDH", http://www.electrosofts.com/sonet/, printed: Jul. 7, 2006, pp. 17 (total).

* cited by examiner

Primary Examiner — Chirag G Shah
Assistant Examiner — Steve Young
(74) Attorney, Agent, or Firm — Harrity & Harrity, LLP (57) ABSTRACT

A method for detecting data frame mode mismatch errors may include receiving a data frame that includes an overhead byte. It may be determined whether a value associated with the overhead byte indicates that a transmitting device operating mode matches a receiving device operating mode. In an additional implementation, it may be determined whether a value associated with the overhead byte indicates that a transmitting device output port matches a receiving device input port. An alarm may be generated when it is determined that the value associated with the overhead byte indicates that either the transmitting device operating mode does not match the receiving device operating mode or the transmitting device output port does not match the receiving device input port.

20 Claims, 8 Drawing Sheets

ERROR DETECTION FOR DATA FRAMES

BACKGROUND OF THE INVENTION

A. Field of the Invention

Concepts described herein relate generally to detecting error conditions in data networks, and more particularly, to identifying mode and port mismatch conditions between network devices handing data frames.

B. Description of Related Art

As innovations continue to increase the rate at which data is capable of being transmitted across data networks, the need to transition between network infrastructure having various capabilities can be problematic. For example, although some network elements may be capable of carrying network traffic at speeds approaching 40 gigabits per second, not all elements in the network may be capable of such speeds. Accordingly, it may be necessary to transition between various speeds as required to traverse the network from a source to a destination.

Synchronous Optical Network (SONET) and Synchronous Digital Hierarchy (SDH) are standards that define data transmissions over fiber optics. The SONET standard was developed by the American National Standards Institute (ANSI), while SDH was developed by International Telegraph and Telephone Consultative Committee (CCITT, now the International Telecommunication Union—Telecommunication Standard Section (ITU-T) to encompass SONET and provide for synchronization between standards. For the purposes of simplicity, SONET/SDH may simply be referred to collectively as SONET.

The SONET standard defines a number of distinct data rates for different levels of service. A typical SONET network can carry from about 52 megabits per second (Mops) up to about 10 gigabits per second (gbps) over a single optical fiber. Recent advancements in SONET technology, however, have enabled transmission or line rates of about 40 gbps.

Accordingly, to support the increased line rates of the newer technology, it may be necessary to utilize lower line rate media in a typical network by reframing or converting the higher speed data into a lower speed format. Problematically, successfully transmitting data following such a conversion requires that the receiving network device be properly configured to identify and receive the converted data.

There is a need in the art to accurately monitor and identify error conditions resulting from data stream rate conversions.

SUMMARY

In one aspect, a method may include receiving a data frame that includes an overhead byte; determining whether a value associated with the overhead byte indicates that a transmitting device operating mode matches a receiving device operating mode; and generating an alarm when it is determined that the value associated with the overhead byte indicates that the transmitting device operating mode does not match the receiving device operating mode.

In another aspect, a network device is provided. The network device may include means for receiving a high line rate data frame; means for disassembling the high line rate data frame into four low line rate data frames; means for setting an overhead byte value for each of the four low line rate data frames, the overhead byte value indicating an operating mode of the network device; and means for outputting the four low line rate data frames to a receiving device.

Another aspect is directed to a network device. The network device includes means for receiving a data frame from a transmitting device; means for identifying an overhead byte value included in the data frame; means for determining whether the overhead byte value indicates a transmitting device mode of operation that matches a receiving device mode of operation; and means for generating an alarm when it is determined that the overhead byte value indicates a transmitting device mode of operation that does not match the receiving device mode of operation.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims.

Figure 1:
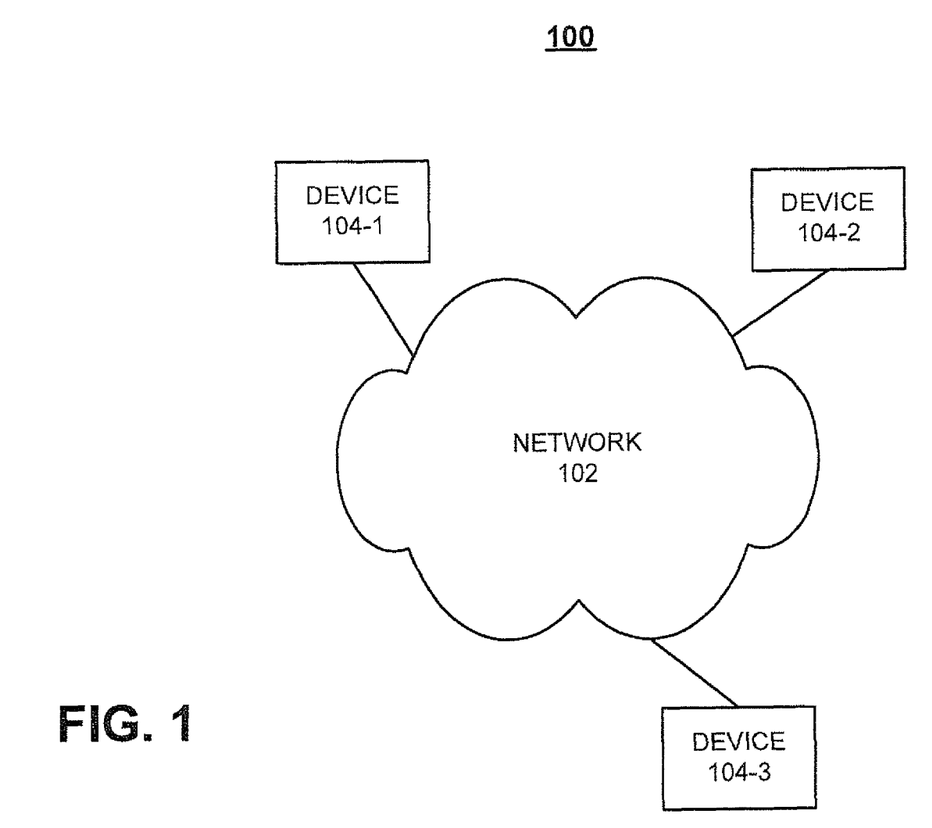
FIG. 1 is an exemplary diagram of a system in which concepts consistent with the principles of the invention may be implemented.

FIG. 1 illustrates an exemplary system 100, which includes an implementation consistent with the principles of the invention. System 100 may include a network 102, and devices 104-1, 104-2 and 104-3 (hereinafter collectively referred to as devices 104) connected to network 102. Devices 104 may be servers, host computers, personal computers, wireless PDAs or any other device capable of connecting to a network in any suitable manner (e.g., wired, wireless, etc.). System 100 may include more or fewer components than shown in FIG. 1. For example, system 100 may have more or fewer devices 104 connected to network 102.

Figure 2:
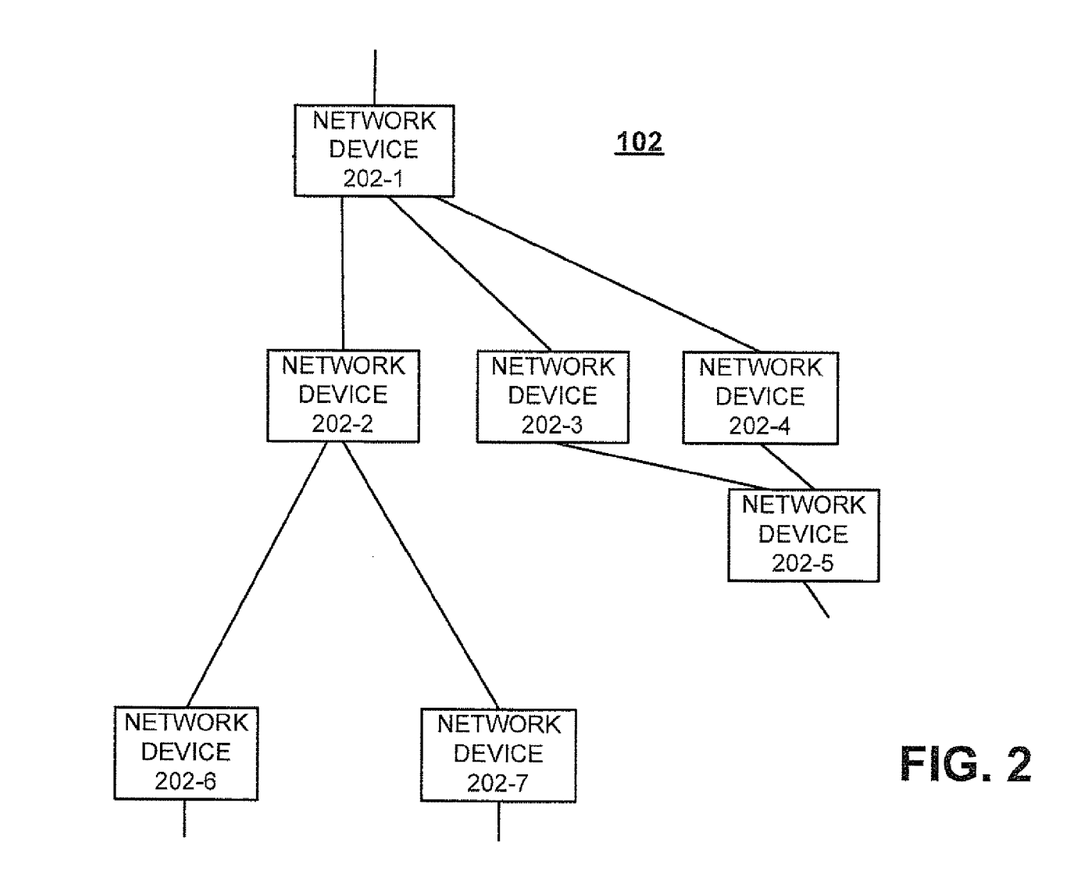
FIG. 2 is a block diagram illustrating a high-level exemplary implementation of the network shown in FIG. 1.

FIG. 2 illustrates a portion of network 102. Network 102 may include a number of network devices 202-1 through 202-7 (hereinafter collectively referred to as network devices 202). Network 102 may include additional or fewer network devices 202 than shown in FIG. 2. Each network device 202 may have connections with one or more other network devices, such as, for example, one or more routers or network nodes.

Figure 3:
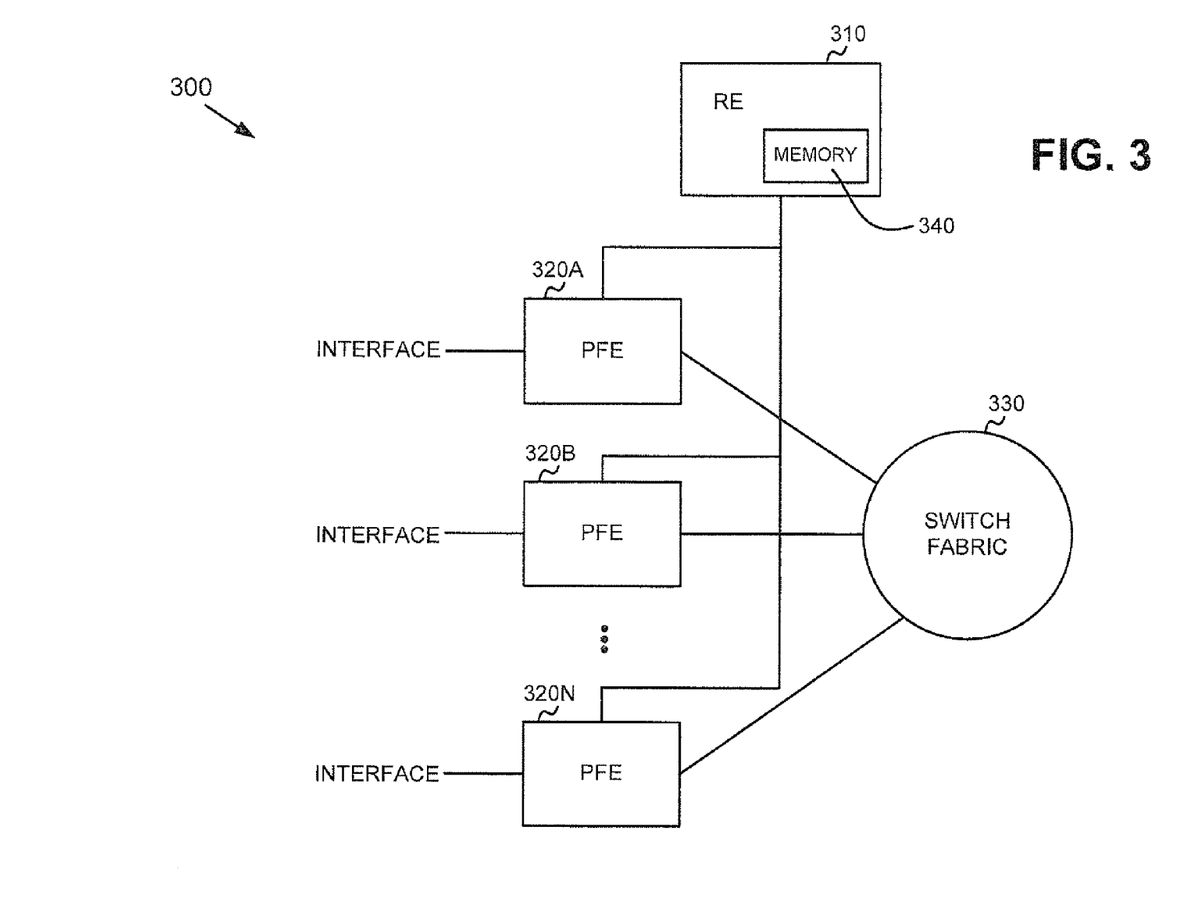
FIG. 3 is a functional block diagram of an exemplary network device shown in FIG. 2.

FIG. 3 is a functional block diagram of an exemplary network device consistent with the principles of the invention. In exemplary implementation, the network device may takes the form of a router, which may be used to implement one or more network devices 202. Network device 300 may receive one or more data streams from a physical link, processes the received data stream(s) to determine destination information, and transmits the processed data stream(s) out on a link in accordance with the destination information. Network device 300 may include a routing engine (RE) 310, packet forwarding engines (PFEs) 320A, 320B, . . . , 320N (referred to collectively as "PFEs 320"), and a switch fabric 330.

RE 310 performs high level management functions for network device 300. For example, RE 310 maintains the connectivity and manages information and data necessary for performing routing by network device 300. RE 310 creates routing tables based on network topology information, creates forwarding tables based on the routing tables, and forwards the forwarding tables to PFEs 320. PFEs 320 use the forwarding tables to perform route lookup for incoming packets and perform the forwarding functions for network device 300. RE 310 also performs other general control and monitoring functions for network device 300. RE 310 may also include a non-volatile or persistent memory 340 for maintaining core routing information in the event of a protocol or system failure.

PFEs 320 are each connected to RE 310 and switch fabric 330. PFEs 320 receive a data stream on physical interfaces or links connected to a network, such as a wide area network (WAN) or a local area network (LAN). Each physical interface could be one of many types of transport media, such as optical fiber or Ethernet cable. The data on the physical interface may be formatted according to one of several protocols, such as the SONET/SDH standard, an asynchronous transfer mode (ATM) technology, or Ethernet. Principles consistent with the invention may be embodied most specifically in SONET/SDH environments, although these principles may be similarly applied to additional interface protocols.

PFEs 320 may process incoming data prior to transmitting the data to another PFE or the network. PFEs 320 may also perform route lookup for the data using the forwarding table from RE 310 to determine destination information. If the destination indicates that the data should be sent out on a physical link connected to one of PFEs 320, then the PEE prepares the data for transmission by, for example, adding any necessary headers, and transmits the data from the port associated with the physical interface. If the destination indicates that the data should be sent to another PFE via switch fabric 330, then PFE 320 prepares the data for transmission to the other PFE, if necessary, and sends the data to the other PEE via switch fabric 330.

Figure 4:
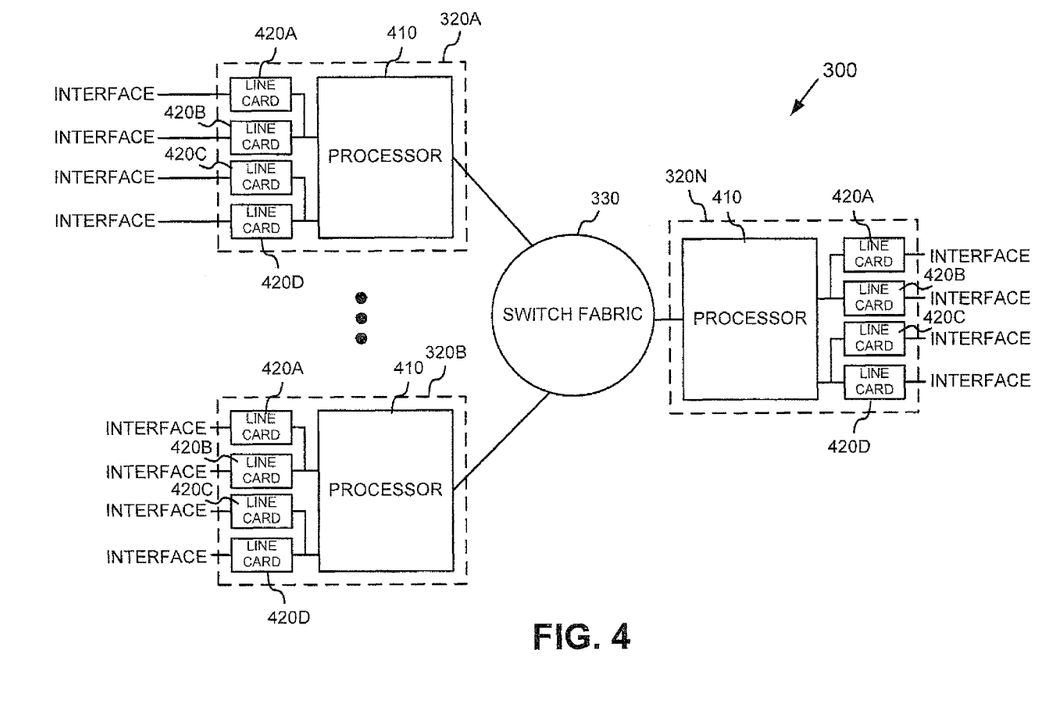
FIG. 4 is a detailed block diagram illustrating portions of a network device shown in FIG. 3.

FIG. 4 is a detailed block diagram illustrating portions of network device 300. PFEs 320 connect to one another through switch fabric 330. Each of PFEs 320 may include one or more processors 410 and a number of redundant input/output interfaces (I/Os) or line interface cards 420A-420D. Although FIG. 4 shows two pairs of redundant line cards 420A and 420B and line cards 420C and 420D connected to each of packet processors 410 and three packet processors 410 connected to switch fabric 330, in other embodiments consistent with principles of the invention there can be more or fewer line cards 420 and/or packet processors 410.

Each of packet processors 410 performs routing functions and handles packet transfers to and from line cards 420A-420D and switch fabric 330. For each packet it handles, packet processor 410 performs the previously-discussed route lookup function and may perform other processing-related functions.

Line cards 420A-420D may transmit data between a physical interface and packet processor 410. Different line cards may be designed to handle different types of network interfaces. For example, one line card 420A may include an interface for an optical link while another line card 420B may include an interface for an Ethernet link, implementing any of a number of well-known protocols. Consistent with principles of the invention, each line card 420A-420D may include a number of discrete ports for receiving or outputting a data stream consistent with its defined type. For example, line card 420A may include four discrete optical carrier (OC)-192 ports for receiving or transmitting OC-192 data streams.

Exemplary Frame Handling

As is known in the art, the SONET transmission system operates by enabling various different types of data to be packaged into SONET data frames transmitted at a uniform rate of 8,000 frames per second or a frame length of 125 ms. SONET systems supporting increased line rates accomplish these enhanced rates by byte-interleaving multiple synchronous transport signals level-1 (STS-1) each having a fixed bit rate of 51.84 Mbps into a each SONET frame. By increasing the number of STS-1 signals included in each SONET frame, increased line rates may be realized. For example, an STS-48 signal includes SONET frames having 48 interleaved STS-1 signals. Because each STS-1 signal has a fixed bit rate of 51.84 Mbps, an STS-48 signal has a bit rate of 2,488.32 Mbps. Similarly, an STS-192 signal includes SONET frames having 192 interleaved STS-1 signals and a resulting bit rate of 9953.28 Mbps (10 gigabits per second).

Figure 5:
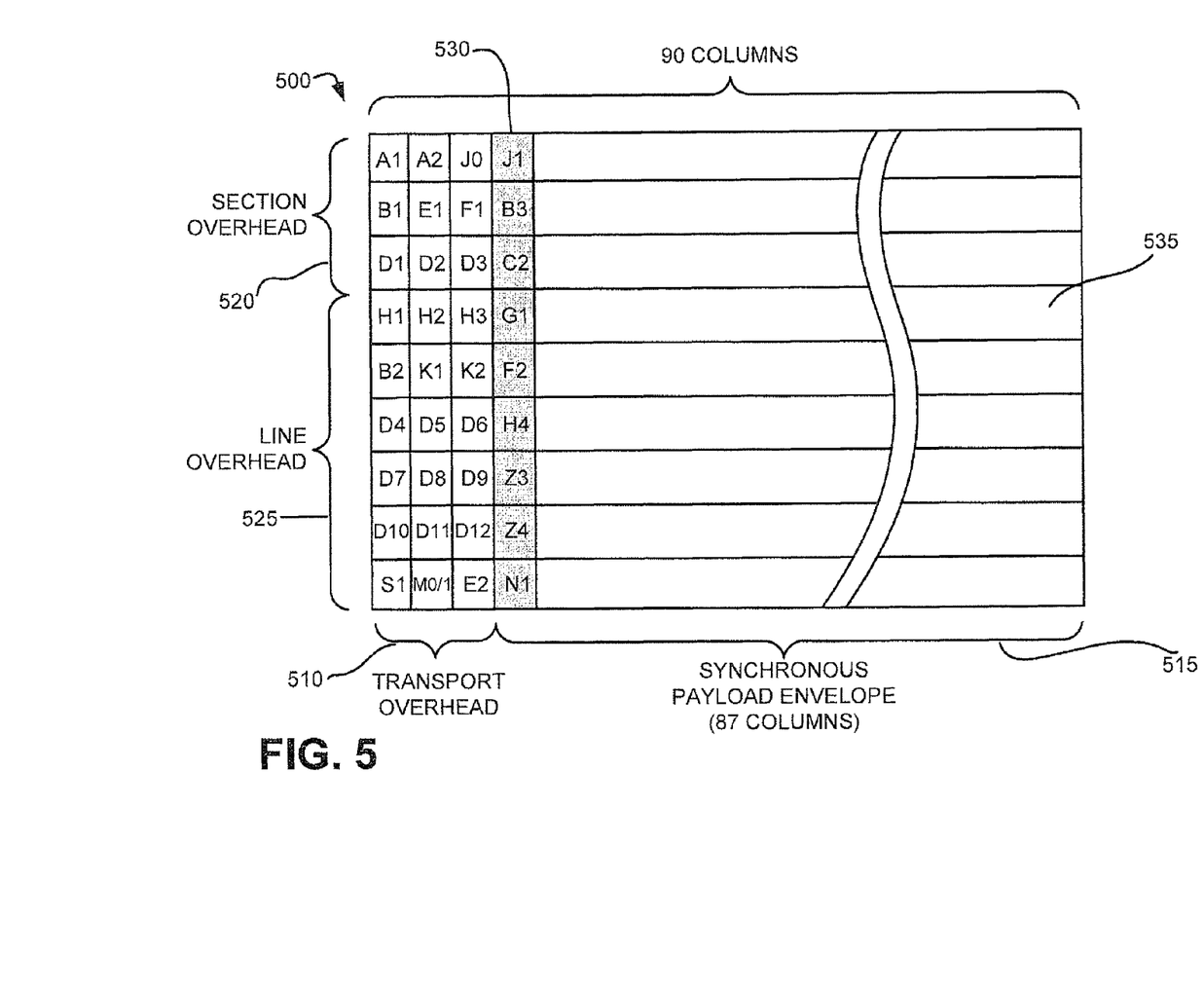
FIG. 5 illustrates an exemplary SONET frame formed from a single STS-1 signal.

An individual STS-1 frame includes 810 bytes arranged into 9 rows of 90 bytes each. FIG. 5 illustrates an exemplary SONET frame 500 formed from a single STS-1 signal. As shown in FIG. 5, STS-1 SONET frame 500 may be divided into two distinct areas, a transport overhead 510 and a synchronous payload envelope (SPE) 515. Transport overhead 510 may be sub-divided into section overhead 520 and line overhead 525. Section overhead 520 includes information used by adjacent network devices or elements and line overhead 525 includes information used by SONET multiplexers in interleaving and disassembling the SONET frames. SPE 515 may be sub-divided into payload overhead (POB) 530 and payload 535. One or more bytes of POH 530 may be currently unused in the SONET protocol.

Consistent with principles of the invention each network device may include one or more terminal multiplexers that convert STS-N signals or other signals to optical carrier (OC-N) signals for delivery via an optical fiber. Similarly, the terminal multiplexer may also operate to convert received OC-N signals into STS-N signals for processing by network device 300. Once a received OC-N signal has been converted from optical pulses to its constituent electrical STS-N and possible other (e.g., DS1, DS3, etc.) signals, each line card 420 may deframe any STS-N frames received at its interface and examine SPE 515 for information that may be used to route the information contained therein.

As described briefly above, in some circumstances, the bandwidth or line rate for a received SONET signal may exceed the line rate for the physical media on the desired output interface. For example, support for OC-768 (39,813 Mbps) signals is limited over much of the Internet backbone. Accordingly, received OC-768 signals may need to be repackaged into lower line rate signals prior to transmission at an output interface. More specifically, each received STS-768 frame may be reframed into four consecutive STS-192 frames. This may be referred to as OC768-OVER-4XOC192, where 4×OC192 refers to line card 420 having four OC-192 interfaces. Upon receipt of the four STS-192 frames, a receiving device may then reassemble the frames into the original, single STS-768 frame for subsequent deframing and processing. Problematically, in cases where the receiving device does not expect multiple related frames or where the receiving ports do not match up to the transmitting ports (causing the frames to be reassembled incorrectly), the STS-768 frame may be improperly received and the information contained therein may be dropped or otherwise lost.

Figure 6:
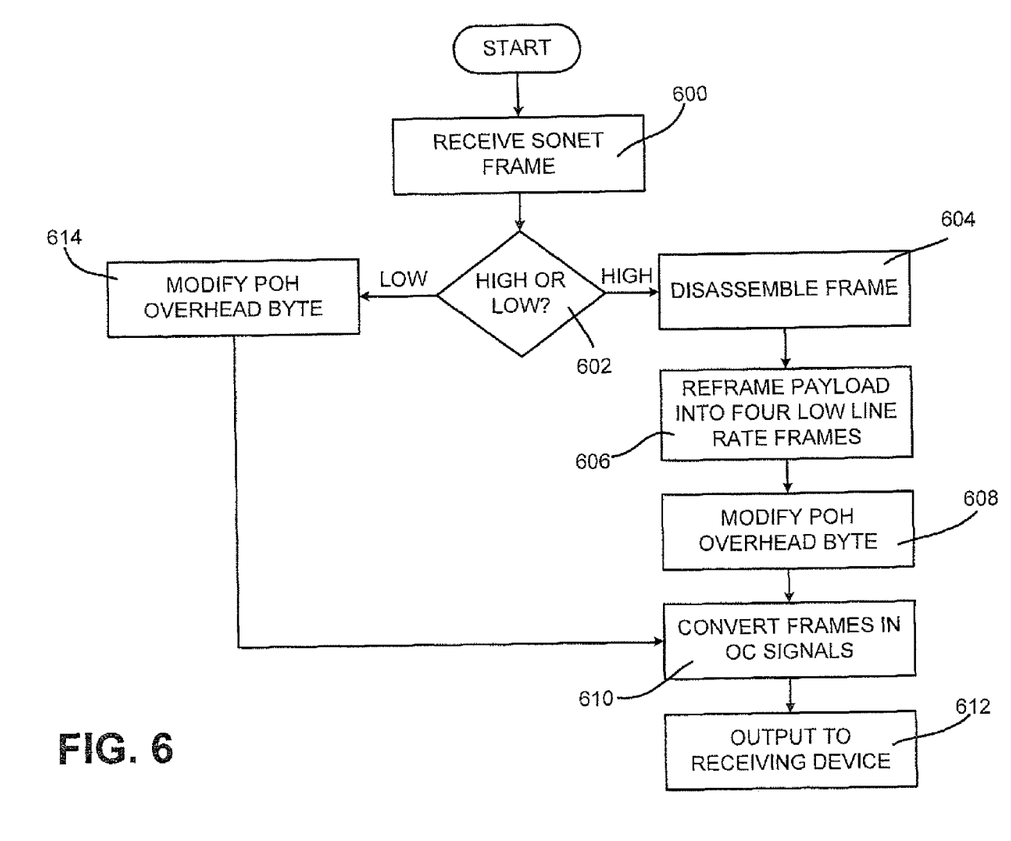
FIG. 6 is a flow chart illustrating exemplary processing for facilitating mode and port mismatch condition detection.

Consistent with principles of the invention, each line card 420 may modify information included within POH 530 of each reduced line rate SONET frame to enable detection of mode mismatch and/or port mismatch conditions. FIG. 6 is a flow chart illustrating exemplary processing for facilitating such mode and/or port mismatch condition detection. Processing may begin upon receipt of a SONET frame for transmission on less than maximum line rate media (e.g., OC-192 media)(act 600). It is then determined whether the received frame is a high line rate frame or a low line rate frame (act 602). If the received frame is a high line rate frame, the received frame is disassembled (act 604) and its payload is reframed into four low line rate frames (act 606). A selected one of the bytes within POH 530 for the generated low line rate frames is then modified to indicate that, upon reception, the received low line rate frames should be reassembled as a high line rate frame (act 608). In essence, this indication serves as a mode identifier to the receiving network device.

Figure 7A:
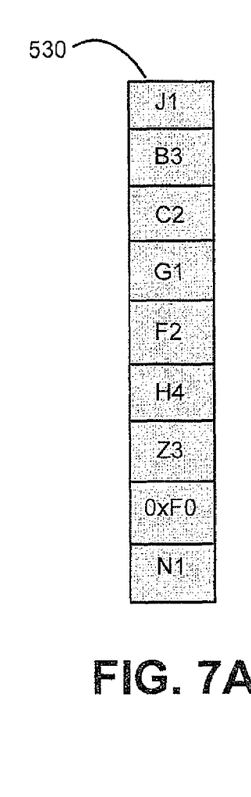
FIGS. 7A-7E are exemplary illustrations of low line rate STS-N frames generated during the process of FIG. 6.
Figure 7B:
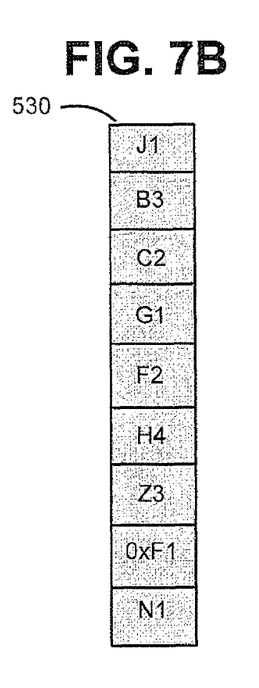
Figures 7C, 7D:
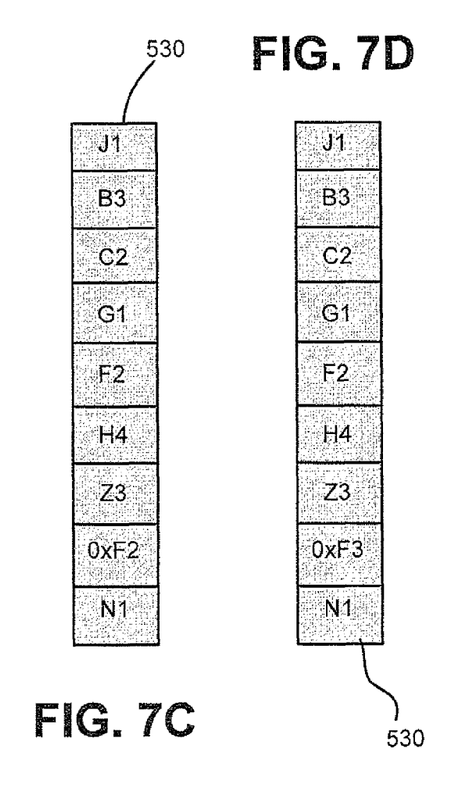

In one implementation consistent with principles of the invention, each designated byte within the POH of each of the four low line rate frames is modified differently, to further enable port matching of the received low line rate frames. FIGS. 7A-7E are exemplary illustrations of low line rate STS-N frames generated in acts 606 and 608 of FIG. 6. As illustrated, the Z4 POH byte may be modified to 0xF0 for the first low line rate frame (FIG. 7A), 0xF1 for the second low line rate frame (FIG. 7B), 0xF2 for the third low line rate frame (FIG. 7C), and 0xF3 for the fourth low line rate frame (FIG. 7D). It will be appreciated that the use of the Z4 POH byte in the present implementation is merely representative of a currently unused POH byte and any suitable overhead byte may be used without departing from the spirit and scope of the invention. For example, the Z3 POH byte is also currently unused in the SONET standard and may be used in a manner similar to that described above referencing the Z4 POH byte.

Once the low line rate frames have been generated, they may be converted to corresponding OC signals (act 610) and output on corresponding output ports onto the physical media (612).

Figure 7E:
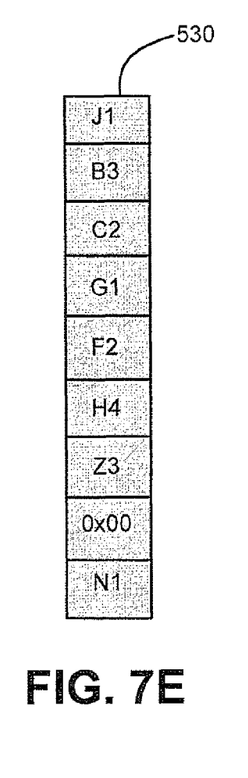

Returning to act 602, if it is determined that the received frame is a low line rate frame, the selected one of the bytes within POH 530 of the received low line rate frame is modified to indicate that, upon reception, the received low line rate frames is in fact a low line rate frame and should not be reassembled as a high line rate frame (act 614). In one exemplary implementation, the Z4 POH byte may be modified to 0x00 for the received low line rate frame (FIG. 7E). The process then continues to act 610 described above for optical conversion and output.

Figure 8:
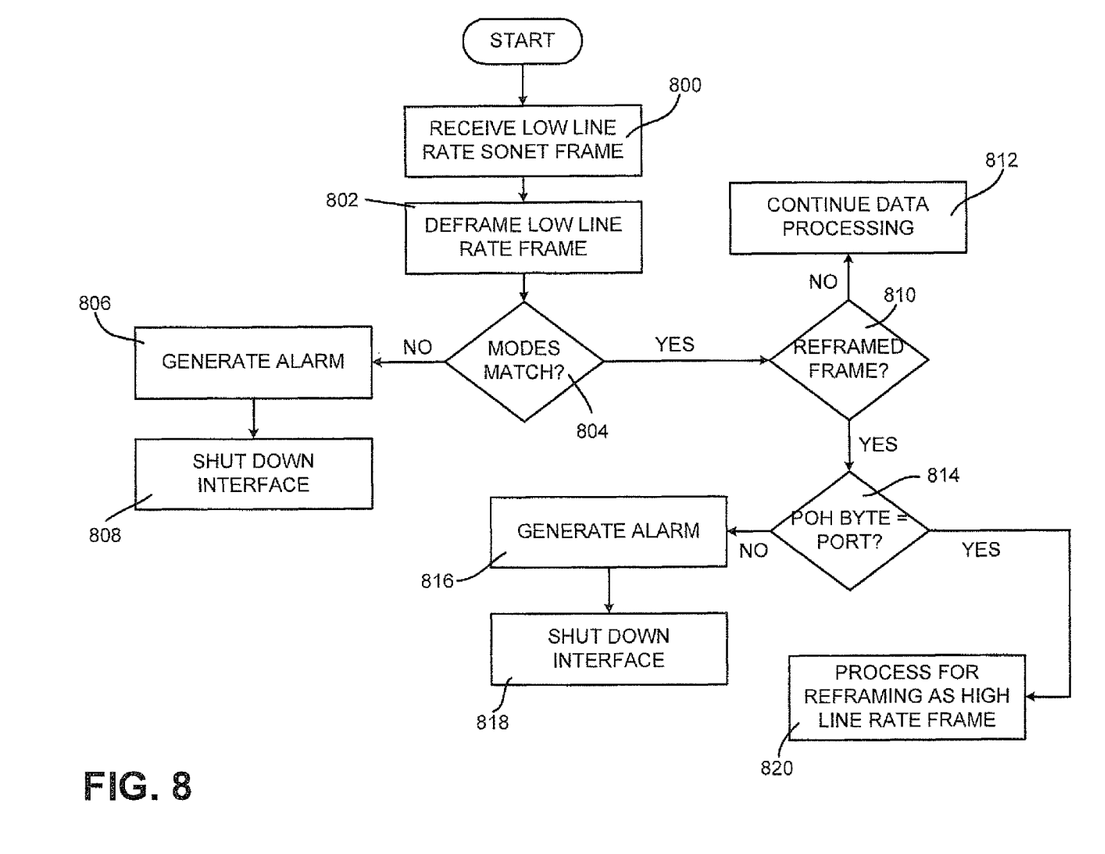
FIG. 8 is a flow chart illustrating exemplary processing for detecting mode and port mismatch conditions for received low line rate frames.

FIG. 8 is a flow chart illustrating exemplary processing for detecting mode and port mismatch conditions for received low line rate frames. Processing may begin upon the receipt of a first low line rate frame (act 800). The low line rate frame is deframed (act 802) and it is determined whether the designated POH 530 byte indicates a mode that matches a mode of the receiving line card 420 (act 804). In one exemplary implementation, the mode determination is made based on whether receiving line card 420 expects to receive a Z4 POH byte having a 0x00 value or a 0xFn value (where n=0-3).

If a mode mismatch has occurred, an alarm condition is generated (act 806) and the physical interface is shut down until the mode mismatch can be corrected (act 808). In one implementation, the alarm condition may be a loss of frame (LOF) alarm. In an additional implementation, an alarm condition may be transmitted to the originating line card 420 indicating the error. Such an alarm condition may include a line remote defect indication (RDI-L).

If a mode mismatch has not occurred (that is, receiving line card 420 has not received an unexpected value for the designated POH 530 byte), it is then determined whether the received frame is a reframed low line rate frame that needs to be reassembled to a high line rate frame in combination with additional low line rate frames (act 810). If not, the mode and port mismatch operation ends and the frame is processed in a conventional manner (act 812). However, if the received frame is a reframed low line rate frame that needs to be reassembled to a high line rate frame, it is determined whether the designated byte value matches the port at which the frame was received (act 814). For example, a Z4 POH byte of 0xF0 should be received at port 0 of the receiving line card 420, a Z4 POH byte of 0xF1 should be received at port 1, etc. If the receiving port number does not match the port number indicated in the designated POH 530 byte, an alarm condition is generated (act 816) and the physical interface is shut down until the port mismatch can be corrected (act 818). If no port mismatch has been identified, the frame is processed in accordance with the identified mode and reframed into a high line rate frame in combination with additional low line rate frames received at additional ports (act 820).

By modifying at least one byte of POH 530 of reframed low line rate frames to designate a mode of the transmitting interface as well as the port to which it is to be received, receiving interfaces may accurately determine whether mode or port mismatches are occurring. Because received frames are deframed and analyzed during conventional frame handling, the retrieval of this byte information may be performed quickly and without requiring significant additional frame processing.

CONCLUSION

The foregoing description of exemplary embodiments of the invention provides illustration and description, but is not intended to be exhaustive or to limit the invention to the precise form disclosed. Modifications and variations are possible in light of the above teachings or may be acquired from practice of the invention.

For example, while a series of acts have been described with regard to FIGS. 6 and 8, the order of the acts may be varied in other implementations consistent with the invention. Moreover, non-dependent acts may be implemented in parallel.

It will also be apparent to one of ordinary skill in the art that aspects of the invention, as described above, may be implemented in many different forms of network topologies, software, firmware, and hardware in the implementations illustrated in the figures. The actual software code or specialized control hardware used to implement aspects consistent with the principles of the invention is not limiting of the invention. Thus, the operation and behavior of the aspects of the invention were described without reference to the specific software code—it being understood that one of ordinary skill in the art would be able to design software and control hardware to implement the aspects based on the description herein.

Further, certain portions of the invention may be implemented as "logic" or as a "component" that performs one or more functions. This logic or component may include hardware, such as an application specific integrated circuit or a field programmable gate array, software, or a combination of hardware and software.

No element, act, or instruction used in the description of the invention should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, performed by a device, the method comprising:
   receiving, at a processor of the device, a low line rate data frame including an overhead byte, where the low line rate data frame includes a synchronous optical network (SONET) data frame and where the overhead byte includes a byte within a path overhead (POH) of the data frame;
   determining, by the processor, whether a value associated with the overhead byte indicates that a transmitting device operating mode matches a receiving device operating mode, where the overhead byte further indicates whether the low line rate data frame should be reassembled with other low line rate data frames to form a high line rate data frame;
   generating, by the processor, an alarm when it is determined that the value associated with the overhead byte indicates that the transmitting device operating mode does not match the receiving device operating mode; and
   sending, by the processor, the alarm to the transmitting device.

2. The method of claim 1, where the overhead byte includes a Z4 POH byte.

3. The method of claim 1, where the overhead byte includes a Z3 POH byte.

4. The method of claim 1, where the value associated with the overhead byte includes one of 0x00, 0xF0, 0xF1, 0xF2, or 0xF3.

5. The method of claim 4, where an overhead byte value of 0x00 indicates a first mode of operation and an overhead byte value of 0xF0, 0xF1, 0xF2, or 0xF3 indicates a second mode of operation.

6. The method of claim 1, further comprising:
   determining, when it is determined that the value associated with the overhead byte indicates that the transmitting device operating mode matches the receiving device operating mode, whether the value associated with the overhead byte indicates that a transmitting device output port matches a receiving device input port; and
   generating a second alarm when it is determined that the value associated with the overhead byte indicates that the transmitting device output port does not match the receiving device input port.

7. The method of claim 1, where the alarm includes a loss of frame.

8. The method of claim 1, further comprising shutting down a physical interface between the transmitting device and the receiving device following the generating of the alarm.

9. A network device comprising:
   means for receiving a high line rate data frame, where the high line data rate frame includes a SONET frame that includes a synchronous transport signals (STS)-768 frame having a synchronous payload envelope (SPE) including a payload overhead (POH) portion;
   means for disassembling the high line rate data frame into four low line rate data frames;
   means for setting an overhead byte value for each of the four low line rate data frames, the overhead byte value indicating that the four low line rate data frames should be reassembled as the high line rate data frame, where the overhead byte includes a byte within the POH of the data frame;
   and means for outputting the four low line rate data frames to a receiving device.

10. The network device of claim 9, further comprising:
    means for setting a POH byte to indicate the mode of operation of the network device.

11. The network device of claim 10, where the POH byte includes a Z4 byte.

12. The network device of claim 11, where a Z4 POH byte value of 0x00 indicates a first mode of operation and a Z4 POH byte value of 0xF0, 0xF1, 0xF2, or 0xF3 indicates a second mode of operation.

13. The network device of claim 12, where the first mode of operation includes an OC768-OVER-4×OC 192 mode of operation and the second mode of operation includes a 4×OC 192 mode of operation.

14. The network device of claim 12, where the means for setting an overhead byte value for each of the four low line rate data frames further comprises:
    means for setting the Z4 POH byte value to indicate a respective output port for each of the four low line rate data frames.

15. The network device of claim 14, where a Z4 POH byte value of 0xF0 indicates a first output port, a Z4 POH byte value of 0xF1 indicates a second output port, a Z4 POH byte value of 0xF2 indicates a third output port, and a Z4 POH byte value of 0xF3 indicates a fourth output port.

16. The network device of claim 9, further comprising:
    means for receiving an alarm signal from the receiving device when it is determined that the operating mode of the network device does not match an operating mode of the receiving device.

17. A network device, comprising:
    means for receiving a low line rate data frame from a transmitting device, where the low line rate data frame includes a synchronous optical network (SONET) data frame;
    means for identifying an overhead byte value included in the low line rate data frame, where the overhead byte includes a byte within a path overhead (POH) of the data frame;
    means for determining whether the overhead byte value indicates a transmitting device mode of operation that matches a receiving device mode of operation, where the overhead byte further indicates whether the low line rate data frame should be reassembled with other low line rate data frames to form a high line rate data frame; and
    means for generating an alarm when it is determined that the overhead byte value indicates a transmitting device mode of operation that does not match the receiving device mode of operation.

18. The network device of claim 17, further comprising:
    means for determining whether the overhead byte value indicates that a transmitting device output port matches a receiving device input port; and
    means for generating an alarm when it is determined that the overhead byte value indicates that the transmitting device output port does not match the receiving device input port.

19. The network device of claim 17, where the data frame includes a SONET frame and the overhead byte value is included in the payload overhead (POH) portion of the SONET frame.

20. The network device of claim 17, where the network device includes a router.

* * * * *